(12) United States Patent
Roselli

(10) Patent No.: US 7,922,090 B2
(45) Date of Patent: Apr. 12, 2011

(54) INFORMATION GATHERING SYSTEM

(76) Inventor: Arcadio Roselli, Little Neck, NY (US)

( * ) Notice: Subject to any disclaimer, the term of this patent is extended or adjusted under 35 U.S.C. 154(b) by 1105 days.

(21) Appl. No.: 11/545,116

(22) Filed: Dec. 12, 2006

(65) Prior Publication Data

US 2008/0140501 A1    Jun. 12, 2008

(51) Int. Cl.
*G06K 19/00*      (2006.01)
*B42D 15/00*      (2006.01)

(52) U.S. Cl. .......................................... 235/487; 283/58

(58) Field of Classification Search .................. 235/487; 283/58

See application file for complete search history.

(56) References Cited

U.S. PATENT DOCUMENTS

| | | | | |
|---|---|---|---|---|
| 3,406,894 A * | 10/1968 | Settle | ............... | 229/70 |
| 4,405,157 A * | 9/1983 | Bennett | ........................... | 283/58 |
| 5,023,435 A * | 6/1991 | Deniger | ......................... | 235/375 |
| 5,308,119 A * | 5/1994 | Roshkoff | ......................... | 283/58 |
| 5,433,483 A * | 7/1995 | Yu | .................................... | 283/58 |

* cited by examiner

*Primary Examiner* — Jamara A Franklin
(74) *Attorney, Agent, or Firm* — Leo G. Lenna

(57) ABSTRACT

A set of forms and information gathering system comprising a questionnaire check having a place to insert answers to questions that are sent to a person along with the check is provided. Once the answers to the question from the questionnaire have been inserted in the supplied area the person taking the survey can cash the check. Once the check is cashed and processed through an Automated Clearing House (ACH) the cancelled check with the answers to the questions. Once the cashed check is received by the sending party, the answers to the questionnaire by the endorsed party will also be received. The data can then be processed and reports generated for the client requesting the data.

7 Claims, 1 Drawing Sheet

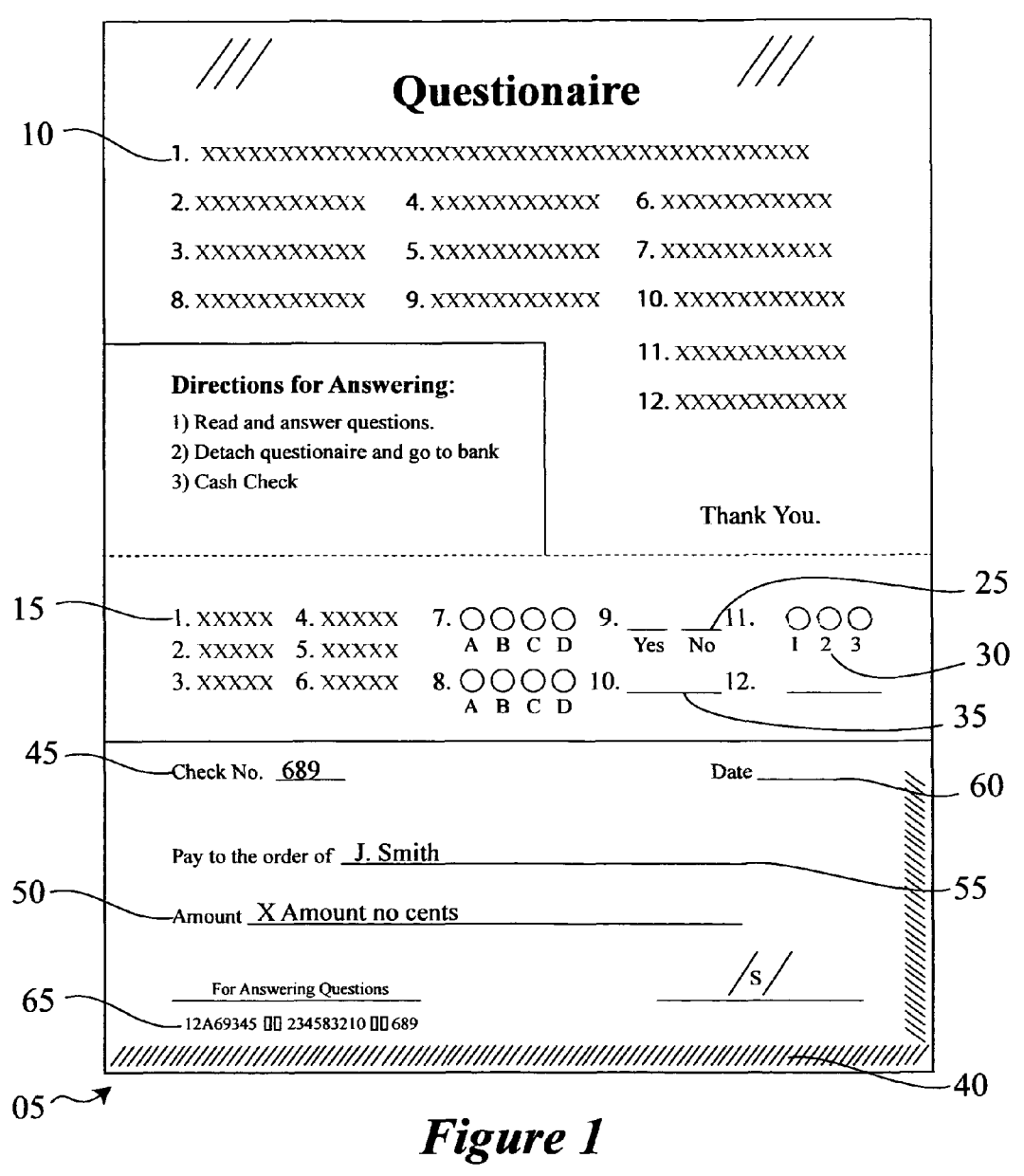

Questionaire

1. xxxxxxxxxxxxxxxxxxxxxxxxxxxxxxxxxxxxxxx 2. xxxxxxxxxxx  4. xxxxxxxxxxx  6. xxxxxxxxxxx 3. xxxxxxxxxxx  5. xxxxxxxxxxx  7. xxxxxxxxxxx 8. xxxxxxxxxxx  9. xxxxxxxxxxx  10. xxxxxxxxxxx 11. xxxxxxxxxxx

Directions for Answering:

1) Read and answer questions.
2) Detach questionaire and go to bank
3) Cash Check 12. xxxxxxxxxxx Thank You.

---

1. xxxxx   4. xxxxx   7. ○○○○   9. ___ ___   11. ○○○
2. xxxxx   5. xxxxx        A B C D      Yes No         1 2 3
3. xxxxx   6. xxxxx   8. ○○○○   10. ___   12. ___
                           A B C D Check No. _689_                                    Date _____

Pay to the order of _J. Smith_ _____

Amount _X Amount no cents_ _____

_For Answering Questions_                    /s/
12A69345 ▯▯ 234583210 ▯▯ 689

*Figure 1*

INFORMATION GATHERING SYSTEM

FIELD OF THE INVENTION

The current invention relates to the field of paper information gathering campaigns and/or the field of survey promotion and fact gathering.

BACKGROUND OF THE INVENTION

There are many different ways available in the market today in which research data is gathered and products are marketed to the general public. In order to be successful in selling products to a given population or target audience, the sales organization must thoroughly understand what the customer prefers and does not prefer. For example, research gathering information about how, where, when, and why a customer shops is very important in order for a selling organization to provide goods and services to that individual, institution and/or business. Information is also important in order to understand and reach the needs of the individual, institution and/or business making the purchase or paying for the services in such a way that the consumer will return to continue to do business with the selling entity. In short, information is one important key to making successful business decisions and driving sales.

Gathering research data and converting it into information for market place is why market research and marketing are a multi-billion industry. However, not all information is the same.

One way to gather information from the public for research and marketing reasons that has been used in the past is to provide payment for the time taken to fill out a quick questionnaire. This has been done usually on a mass scale basis and the payment form varies from discounts at particular stores, sweepstakes, redeemable prizes, which are not readably readily available to the consumer and usually cost something for the consumer to obtain, such as paying for shipping and handling, to actual currency sent in the mail. In the case of currency, many thousands of dollars are lost annually because the envelope was never opened and discarded as "junk mail".

Several problems exist with these types of fact gathering campaigns. First, these fact-gathering campaigns usually contain the same set/type of questions for each recipient in a group. Therefore, most of the time if not all of the time, the questions posed to the consumer are too and/or do not provide useful information. Second, the questions and/or actions that need to be taken take too much time to complete and do not provide instant gratification to the survey taker. Thirdly, the mail is usually addressed improperly or generically such as to "current resident", to "dear consumer." This immediately gives the recipient the sense that the survey is not specifically directed to them and therefore is usually discarded as a useless promotion along with the money inside the envelope package.

In addition, the mail piece and reward for filling out the questionnaire are usually small and not traceable. The higher forms of rewards require the recipient to take some affirmative action, such as purchase something, turn on a phone, or the like, so that they can receive something free. Or in some cases require the recipient to call a toll-free number where the person that answers the phone is trained in trying to sell something to the caller rather than gathering the data from the survey. Another method of payment used is sending actual money in the mail, typically a dollar bill attached to a common questionnaire that is usually either too general and/or too long. These types of campaigns are not affective in gathering data since most of the time the recipient (if they open the mail) just takes the money and does not answer the questionnaire.

To compound the problem, usually the way that these mass surveys are conducted, the company running the survey does not follow up on the survey recipients that were sent the mail piece, but did not respond. In fact, most of the questionnaire campaigns are not set up for any type of follow up at all. The only way that a follow up would be conducted would be if the recipient of the mail actually contacted the sender to claim a prize. This type of survey only provides sheer numbers to the seller and not quality information.

For all of the aforementioned reasons, these types of campaigns are only marginally affective, if at all. Therefore, what is needed is a fact gathering campaign surrounded by a comprehensive program that is well defined and designed to gather data and/or introduce a concept to individuals with a compensation system that is both effective in getting the recipient to complete the information and allows the sending party to gather information quickly and affectively, track who has taken the reward but not responded, or who has not even taken the survey. It is this comprehensive data gathering and application system that is described herein and overcomes the aforementioned shortcomings of the prior art discussed above.

SUMMARY OF THE INVENTION

The present invention relates to a form set and fact gathering system having a plurality of parts comprising a questionnaire and a questionnaire check. The questionnaire comprises a series of questions designed to gather information about a specific subject or target. This can be a process, a company, a product or a particular buying habit of the subject to which it is addressed. The questionnaire check is made payable to the subject to whom the form set is sent. The questionnaire check can either be designed so that it is separate from the questionnaire or in the alternative is attached to the questionnaire in such a way that it is easily detachable from the questionnaire.

The questionnaire further comprises of an area on the check for recording answers to questions from the questionnaire. Once the area for entering answers to the questions from the questionnaire on the check has been fully completed, the check can either be separated from the check, if was attached, and cashed in a banking institution. The check, once processed by the banking institution, is cancelled as paid and returned back to the sender. The cancelled checks, if properly filled out by the subject cashing it, should contain the answers to the questions on the questionnaire. These answers can then be processed using the method for gathering information in accordance with another embodiment of the invention.

As stated above, a second embodiment of the invention relates to a method for gathering information. The method for gathering information uses the form set described herein to gather targeted information from carefully selected subjects. The process starts by securing a prospect list comprising subjects to be surveyed. Once the prospect list is gathered, a questionnaire is designed and printed comprising questions specific to the subjects on the prospect list to whom it will be sent. A questionnaire check is then designed (as a template) and printed having an area designed to insert answers to the questions from the questionnaire. Once both the questionnaire and questionnaire check is designed and printed it is inserted into an envelope for mailing.

In order to properly collect, process and respond to the data obtained from the questionnaire check, an interrogatory scheme including alert triggers is developed. In order to automatically capture the data, Optical Character Recognition technology (OCR) is used. This allows for an OCR template from the questionnaire check and a database to be created using the questionnaire checks and the OCR templates. In order to report the data captured, reports for summarizing and/or categorizing the data captured from the questionnaire checks are developed as a system in this process. This system includes viewing workstations that present data captured from the check that was potentially hand written by the recipient and that is not recognized by the OCR system. The operator of the workstation would confirm that the data scanned in during OCR process and interpreted as an alpha character or numeric character is correct by comparing the image to data. This is particular process is used to ensure data integrity for quality assurance of the data set.

The data set is then ready for the reporting process. Here custom Reports are created utilizing the data set captured from the received cancelled checks. These reports are designed to convert the data captured into useful information. This process is used to report the data gathered from the questionnaire checks as well as data not gathered. In other words, questions that were not answered by the person taking the survey or questions that were incorrectly answered by the subject when taking the survey. When necessary the OCR process allows operators to contact the individual that took the survey to gain the answer to a question that was left blank or answered incorrectly.

Again once the cancelled checks are obtained, the cancelled checks are recorded by scanning the checks as viewable images, and using the OCR template process in order to fully capture the data. So that the process of converting data into information is as precise as possible, the data captured is verified at workstations by human intervention and stored (sometimes keyed manually) into the database. Once stored, the data is reported using the reports designed for summarizing and/or categorizing said data into useful information.

One clear advantage of the data gathering method and form set of the present invention is the ease of gathering the data and the quality of the information gathered. Other aspects and advantages of the invention are further described in the detailed description of the invention that directly follows.

BRIEF DESCRIPTION OF THE FIGURES

FIG. 1 is a questionnaire and questionnaire check according to the present invention.
(05) Questionnaire/questionnaire check
(10) single question on questionnaire
(15) rating question on questionnaire
(20) directions for answering questionnaire
(25) preprinted answers
(30) numbered answer
(35) space provide for answer on questionnaire
(40) anti-counterfeit protection
(45) check number
(50) amount of check
(55) pay to order of line
(60) date
(65) bank processing codes

DETAILED DESCRIPTION OF THE INVENTION

The present invention relates to an information gathering system and a questionnaire/questionnaire check used to gather key information from targeted audiences. The questionnaire and questionnaire check can be delivered to a targeted subject either through conventional mail, via the Internet, or other suitable delivery means. Once received, the questionnaire can be completed and the answers inserted on the questionnaire check. At this point all the person taking the questionnaire has to do is cash the check.

Once the questionnaire check is processed, the check, or the virtual image of the check, is returned to the sender. If the person to whom the check is addressed answered the questionnaire, his/her answers would appear on the cancelled check. In the event that the answer grid on the cashed check is incomplete, or does not contain answers at all, then the sender can easily follow up with the person to which the questionnaire was sent. This process also identifies who did not answer or cash the questionnaire check. This is further described below as part of the complete information gathering system.

The questionnaire check is an essential part of the complete information gathering system of the present invention. One underlying premise of the present invention is that getting the information, or not getting the information, from targeted individuals has to be easily tracked and must be as effortless as possible for the person to take the questionnaire and cash the check. Placing the answers to the questions on the questionnaire directly onto the provided area of the check gets the information back to the sender without making the person answering the questions take any additional effort after completing the questions. In other words, the person taking the questionnaire does not have to mail, fax, e-mail anything or call any number once he/she has completed the questions in order for the sender to get the information. Eliminating the transmittal step and providing compensation for the time taken to answer the questions in the process makes it more compelling for a person taking the questionnaire to actually take the time out of his/her schedule to complete the task. The questionnaire check makes the information gathering campaign more effective overall.

FIG. 1 shows an example of a questionnaire check (05) having an answer grid along the top portion of the check (35) wherein each answer is numbered (30) and corresponds to a specific question on the questionnaire. As shown in FIG. 1, the answer grid (35) can be grouped so that several answers correspond to one question on the questionnaire and each numbered space on the answer grid (35) indicates an answer gradation. For example, the description next to answer lines provided for question 1, namely groupings 1-4, have the descriptive term "frequently" (25) as one of the choices to this question. Answer lines 2-3 on the answer grid (35) each correspond to other gradations that can be used to answer the question. Other examples that show this type of arrangement are shown by the following answer groupings 1-4, 20-22, 40-42, and 43-45. Answers may also be grouped so that one question can have multiple answers. For example, answer groupings 5-12, 13-19, 23-30, and 33-39 show how this can be done.

As can be seen from this example, the questionnaire check (05) looks like a normal check having a payable line (30), a date line (60), a numerical amount line (50), and a series of MICR encoded numbers and/or symbols for processing/routing the check (65). In the alternative, the answer grid can be placed in any other portion of the check as long as it does not interfere with the payable line (50), the date line (60), the numerical amount line (50), and the series of numbers and/or symbols for processing/routing the check (65).

The type of questions on the questionnaire can be written so that the person answering can check one out of several choices (10). Each of the choices would correspond to a different number on the answer grid and depending on which answer is checked would indicate the rating provided by the person taking the questionnaire. Another type of question (15) can be a question that requires the person taking the questionnaire to rate something usually using a number scale or ABCD. These can be placed in the corresponding number on the answer grid on the questionnaire grid.

The answer grid can be in the form of blank spaces (35) so that short answers can be inserted therein, letters and/or number bubbles that can be circled or filled in, or true or false choices that can be circled. Since the check can be separated from the questionnaire at a detachable portion (70) any answers placed on the check would be incomprehensible to any person involved in processing the check at the financial institutions and therefore the privacy of the person taking the questionnaire is not compromised. The questionnaire check can also include an anti-counterfeit design (40). The check can be numbered (45) for control and can also include an expiration date (75). The questionnaire portion of the questionnaire check (05) can include instructions (20) on how to enter answers to the questions on to the answer grid (35).

Although the questionnaire check is an essential component of the information gathering system of the present invention, there are several necessary steps that need to be performed prior to sending out the questionnaire and after the cashed check is received or not received by the sender. Table 1 shows a flow chart that details the steps of the information gathering system of the present invention. This flow chart is designed to show all of the possible steps in the information gathering system of the present invention, but not every step needs to be taken in order to fall within the scope of the invention. In other words, different embodiments of the invention are anticipated by the present invention that contains less than all of the recited steps.

First, the monetary face value of each check must be determined when defining the purpose for gathering the information. Usually, the smaller the face value of the check, the more general the population to which the questionnaire is to be directed. In other words, a small face value on the check would not be as attractive to a top executive of a company but may be attractive enough to a blue-collar worker so as to entice the person to fill out the questionnaire. The face value of the check is not by itself the only significant reason for participating in the survey study. The inventor also provides an optional summary report from the captured data a compiled report of information that is made available only by indicating on the back of the check by placing a "check mark" in a box provided. In so doing the receiver of the check can indicate their interest in receiving a report that compares their organization against the sample population of its peers. The report content allows the targeted sample audience to better understand their respective markets. The value of the report makes it compelling for anyone in the executive branch of any business or enterprise to participate in this study. The objective is to motivate and focus the attention of a CEO, CFO, president, senior vice president, or an officer of a company so as to get them to participate and answer the questionnaire. The study data/information is gathered and compiled in a proprietary data model for reporting. The data has more value in some instances of this process to the targeted audience in the study campaign. Meaning a copy of the reports that disclose the results are made available to the audience participating in the survey process. The report's inherent value is added motivation or even the only motivation needed for the participant to answer the questions of this survey process. The study results and a special report for each participating target is made optionally available to this audience by allowing the participant to indicate on the reverse side of the check that they would like to receive this report after the study is concluded.

The process requires that once the face value of the check and the scope of the information gathering campaign are defined then a prospect list can be secured and a cover letter developed. Since in most cases the information gathering campaign of the present invention will be customized to demographically targeted groups, or using the standard industrialized code (SIC) numbers identify participants or in some cases to specific individuals (users in databases of respective businesses whose opinion is of interest. This in turn requires that a specific cover letter be drafted for the specific audience being surveyed. For the most part many sections of the cover letter can stay the same but either additional information and or information can be drafted in place of a section so as to introduce the questionnaire and entice the recipient to fill out the questionnaire.

Once the cover letters are drafted then they can be addressed. This process can be done using a mail merge process or maybe outsourced to a large direct mail fulfillment center or some other process that is capable of taking names and addresses from a list and merging them on to documents. The same process can be used to endorse the checks once they have been designed.

Since each campaign has a different target audience, the interrogatories need to be carefully designed and developed to achieve a statistically valid data set. Along with the interrogatories a number of alert/triggers also need to be defined and developed.

The invention also includes an application that allows one to develop a custom alerts/triggers that essentially are rules based on a condition or pattern of responses provided on the questionnaire. The trigger/alert condition is a predefined pattern based on how the questions are answered; each question on the questionnaire can also have a predefined score for the response that one selects. The system monitors for the predefined condition, pattern or score during the data capture to the database. The predefined conditions for each alert are being continuously monitored by this application/system. The alert/triggers are predefined conditions quantified from how the questions were answered. The purpose is to allow an automated mechanism that can effectively identify the pattern or condition of answers that would categorize a questionnaire recipient into a given category when the answer is evaluated later in the process. For example, if a question on the questionnaire requires a person to state the age of his home computer and he states it is over 5 years old this might be an alert/trigger that places this person into a category of a person that is likely to purchase a computer in the next year. Accordingly, this information can be provided back to the computer-selling customer in later generated report. This is but one example what an alert/trigger might be and it is understood that other alerts/triggers will be developed which is custom designed based on the elements on the questionnaire and depend upon the specifics of each campaign. The alerts/triggers are all custom to each campaign and the interrogatory being used in the campaign. The alerts/triggers compile the data captured into a report that then gets converted to a PDF, Excel, and other commonly used file types. Each report file then gets distributed immediately by:

Cell phone as a text message,

Email with the report attached or made available by a hyperlink within the email, Facsimile An interrogatory can have multiple alerts/triggers defined.

Alerts/triggers can have multiple recipients defined to receive them

The interrogatories developed must be written so that the quantity of questions is limited to the space of the check. As a rule the number of questions should not exceed 15 because the participant will find it too long and not to participate or otherwise provide accurate answers. The response types do not require long answers, since the answer to these questions are to be fact gathering and are to be placed on the questionnaire check. For example, the interrogatories should be designed so that the answer can be communicated by using either a yes/no; true/false; a number rating system; a number and/or lettering system that corresponds to longer answers on the questionnaire A powerful attribute of the system is that all of the participants are part of a control group that can be easily identified and later invited to participate in more dialogue if necessary.

Once the interrogatories are developed then the design of the check can be completed. The Answer grid must be located on the check in such a place that it does not interfere with the normal bank processing system. The layout of the check may include number or letter bubbles that can be filled to in response to questions. These are easy to capture the data simply by scanning the checks or images of the checks using Optical Character Recognition (OCR) Technology. The check may include numbered lines that the answers can filled in or an indicator that can be circled or filled in to communicate an answer. Whatever the design, it must fit onto the check design.

From the questionnaire check an OCR template would be developed so as to facilitate automatic high-speed data capture. From this data a new database would be created to store the results from the questionnaire. The database would also include data entry screens designed to manually capture data from the checks in case the answers on the questionnaire check cannot be recognized by scanning. Data entry screens may also be developed that are designed to verify the data captured.

Once the interrogatories are completed and the design of the check is set the checks can be printed and endorsed using a mail merge system as stated above. In the case where the questionnaire is attached to the questionnaire check the questionnaire would be printed along with the check separated by a perforation for easy detachment of the check. The check/questionnaire should be foldable so that the "pay to the order of" portion of the check can appear in a windowed envelope. In the event that the questionnaire is separate from the questionnaire check but attached to a cover/introduction letter then the introduction letter would be printed at the same time of the check. Finally, the questionnaire check, introduction letter, and set of interrogatories can be printed separately.

Whichever method is used, all items that are part of the initial mailing can be printed and enclosed in a window envelope. The purpose of a windowed envelope is to clearly indicate that a check is enclosed payable to the recipient. This is often thought to get the recipient to open the mail instead of simply disregarding before reading.

Now that the interrogatories are ready to go to their recipients or while they are in the process of being prepared reporting screens and reports that categorize and summarize the data captured must also be developed. This might require designing data entry screens with alerts/triggers as well as developing computer code that will recognize these alerts/triggers and properly summarize and/or categorize them as desired. This part of the data gathering system is very important since the same information that is received via the questionnaire checks may be used for several clients and would have to be categorized accordingly. In addition, the better you can categorize the data being captured, the better it can be analyzed and then put to proper use.

Once the questionnaire checks begin coming into the office they are scanned, and the information from these checks are either OCR scanned into the database and/or manually entered into the database. The data is promptly verified once it is gathered so that the interim summaries of the data while the campaign is still in progress reflect the proper information.

The level of response will be tracked. Any checks cashed without completing the questionnaire at all/ or only partially will be set aside and either a second letter is sent out requesting that the questionnaire be completed or the person is contacted by telephone.

Finally, the data collected will be categorized and summarized into specific reports. These reports will be customized for particular clients and their specific campaigns according to their requests/needs. Since one data pool can be used to answer different questions for different clients. For example, one reports may list prospects for purchasing a computer from best to worst based on the alerts/triggers developed in the database, while another report can list households likelihood to use the internet to bank. The data will be stored which can be used at a later date to further process the information to provide reports that look at the data in a different way.

As one skilled in the art can see, getting the data is an essential element in this process/method of gathering and processing data. Getting people to spend the time to fill out a questionnaire is a high hurdle to overcome in order to get the data. It is believed that the questionnaire system described above makes it simple and quick enough that a person would fill out the questionnaire and reap the reward. It is also true that the questionnaire check provides a simple way to get the reward to the recipient and the data back to office for processing.

Below in Table 1 is flow chart depicting one embodiment of the present invention. The flowchart can be used as a guide for the flow of information and money in the information gathering system of the present invention. The flow chart is designed to be fully inclusive of the many different steps that can be taken to gather information using the method of the present invention. The flow chart is merely a guide and is not the method of the claimed invention may or may not include each of the steps recited herein.

Check Data Collection Lead Development Flowchart

TABLE 1

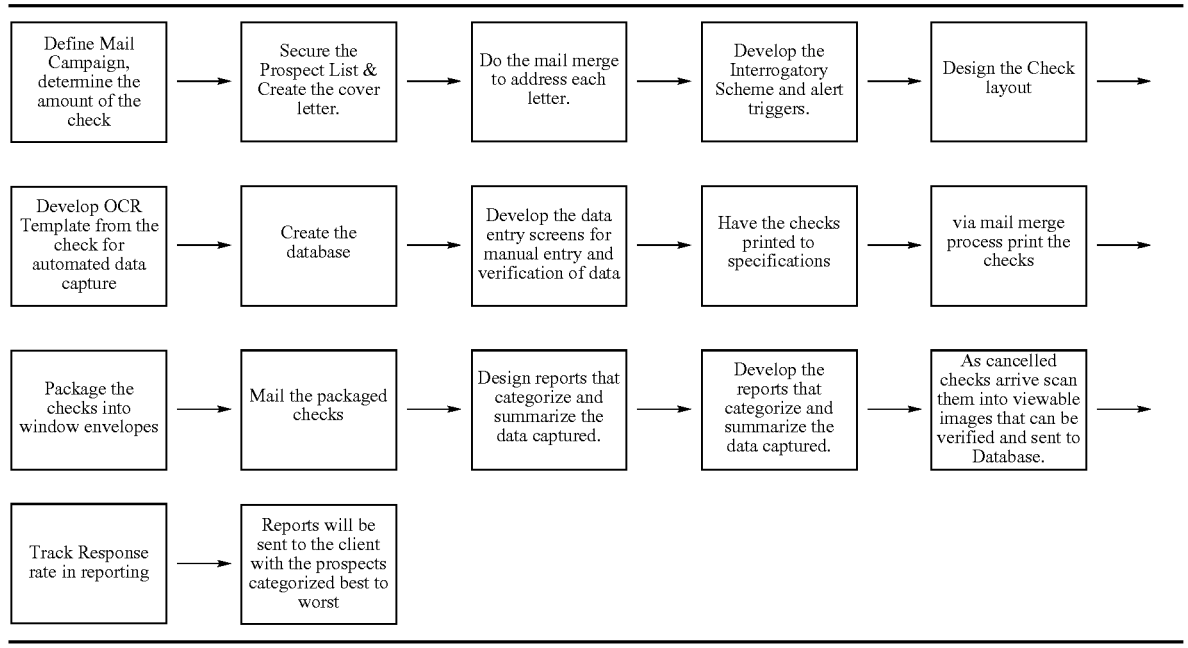

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

What is claimed is:

1. A method for gathering information comprising:
securing a prospect list comprising subjects to be surveyed using Standard Industrial Classification (SIC) codes to target an audience for a sample;
creating and printing a questionnaire comprising questions specific to said subjects on said prospect list;
designing and printing a questionnaire check comprising an area to insert answers to said questions from said questionnaire;
placing said questionnaire and said questionnaire check into an envelope for mailing;
developing an interrogatory scheme and alert triggers based on a condition or pattern of responses provided on the questionnaire;
developing an OCR (Optical Character Recognition) template from a sample questionnaire check for automatic data capture and creating a database with said OCR template;
designing reports for summarizing or categorizing said data captured from said questionnaire checks and using said reports to report said data gathered from said questionnaire checks;
recording cancelled questionnaire checks by scanning said checks as viewable images, and scanning the questionnaire checks using said OCR templates from data capture;
verifying said data captured from said questionnaire check and storing said data into a database;
reporting said data using said reports designed for summarizing or categorizing data.

2. The method for gathering information according to claim 1 further comprising;

interacting with said subjects who either cashed said questionnaire checks without entering answers to said questions on said questionnaire checks or subjects that have not yet responded to said questionnaire.

3. The method for gathering information according to claim 2 wherein said questionnaire and said questionnaire check is adapted for insertion into said envelope wherein a name and address of said subject is displayed in an envelope window for delivery.

4. The method for gathering information according to claim 2 further comprising developing and entering data into data entry screens for manual entry and verification of data captured from questionnaire checks.

5. The method for gathering information according to claim 1 further comprising a cover letter introducing and explaining said questionnaire and said questionnaire check.

6. The method for gathering information according to claim 1 wherein the questionnaire created is paperless and is created on an electronic means of communication and funds are transferred electronically into a recipient's account once the survey is completed.

7. The method for gathering information according to claim 6 wherein the electronic means is selected from the group consisting of instant messaging, electronic mail (e-mail), interactive voice activated media and any combination thereof.

* * * * *